United States Patent [19]

Borchers et al.

[11] Patent Number: 5,669,263
[45] Date of Patent: Sep. 23, 1997

[54] PROBE FOR MONITORING LIQUID WITH PROTECTION AGAINST LEAKAGE

[75] Inventors: Kerstin Borchers; Joachim-Christian Politt, both of Bremen; Holger Schroter, Achim, all of Germany

[73] Assignee: Gestra Aktiengesellschaft, Bremen, Germany

[21] Appl. No.: 602,096

[22] Filed: Feb. 15, 1996

[30] Foreign Application Priority Data

Mar. 4, 1995 [DE] Germany ............... 195 07 616.8

[51] Int. Cl.⁶ .................................................. G01F 23/00
[52] U.S. Cl. ........................ 73/304 R; 73/866.5; 73/304 C
[58] Field of Search ................ 73/866.5, 304 R, 73/304 C

[56] References Cited

U.S. PATENT DOCUMENTS

| | | | |
|---|---|---|---|
| 4,507,521 | 3/1985 | Goellner | 73/304 R |
| 5,304,985 | 4/1994 | Cosser | 73/304 R |
| 5,391,839 | 2/1995 | Lang et al. | 324/448 |
| 5,481,197 | 1/1996 | Sanders et al. | 324/690 |

Primary Examiner—Ronald L. Biegel
Attorney, Agent, or Firm—Collard & Roe, P.C.

[57] ABSTRACT

In the presence of a defect in the insulation cover of known probes, liquid medium can leak from the container into the interior space of the housing of the probe, and from there into the surrounding environment, and endanger or even injure persons present there. The probe housing has an interior space with two chambers. The first chamber, which is close to the container, is capable of withstanding the pressure prevailing in the container. A passage opening present between the first chamber and the second chamber for the sensor electrode, or for its electrical conductor, is closed by a movable closing part or a stationary closing element. In the event of leakage through the insulation cover, the pressure would be transmitted from the container into the first chamber, but could not propagate from there into the second chamber and on from there. In this way, in the event of a defect, medium that is discharged under the operating pressure prevailing in the container, is prevented from flowing through the probe housing and into the environment, where it would become a hazard to persons present there.

17 Claims, 3 Drawing Sheets

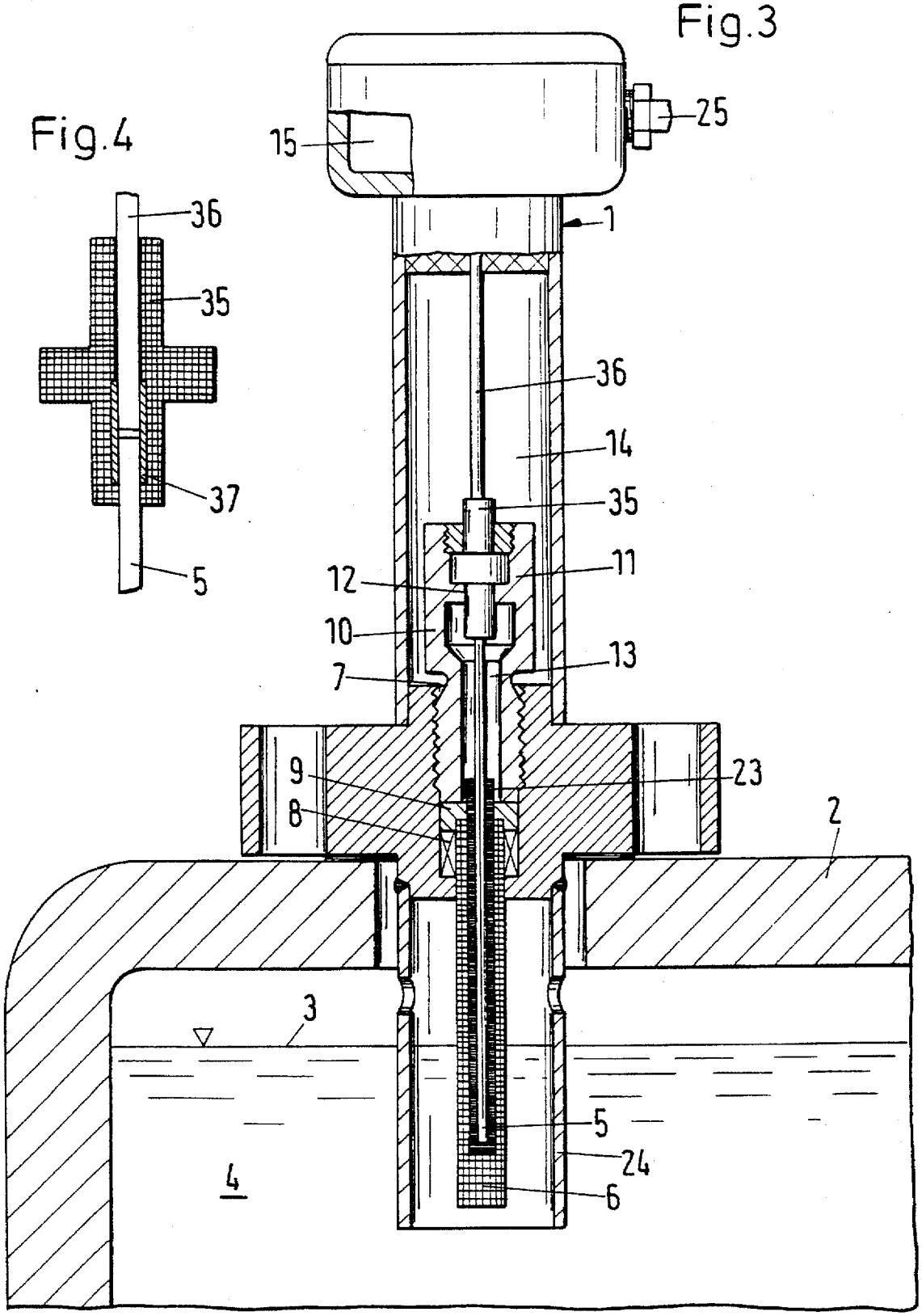

PROBE FOR MONITORING LIQUID WITH PROTECTION AGAINST LEAKAGE

BACKGROUND OF THE INVENTION

1. Field of the Invention

The present invention relates to a probe for monitoring liquid in a container.

2. The Prior Art

In the event of a defect in the insulating cover, for example, fracture of a ceramic insulation cover, it is possible in connection with such probes that medium leaks from the container into the interior space of the housing of the probe, and from there possibly into the environment. Especially when used under high temperatures and pressures as prevailing, for example, in connection with high-pressure steam, this results in a great hazard for persons present within the proximity of the probe.

SUMMARY OF THE INVENTION

It is an object of the present invention to provide a probe for monitoring liquid in a container, which can be used without danger within a wide temperature and pressure range.

This object is achieved by a probe for monitoring liquid in a container, with a probe housing to be mounted on the container, a sensor electrode projecting into the container, and an insulation cover surrounding the sensor electrode in the container and supported sealing on the probe housing, characterized in that the interior space of the probe housing has a first chamber close to the container and a second chamber remote from the container, as well as a separation wall present between said chambers, said wall being provided with a passage opening; the sensor electrode or an electrical conductor connected therewith extends from the first chamber through the passage opening and into the second chamber; the walls of the first chamber close to the container, including the separation wall is designed pressure-proof; and provision is made for means sealing the passage opening pressure-tight.

The interior space of the probe housing has two chambers, of which the first one close to the container is designed in such a way that it is capable of withstanding the pressure prevailing in the container. In the event the insulating cover is damaged, the pressure would be transmitted from the container into the first chamber without, however, being capable of propagating from there into the second chamber. In this way, in the event of a defect, the medium, which is under the operating pressure prevailing in the container, cannot reach the surroundings through the probe housing, endangering or injuring persons present there. While the first chamber has to be designed to be pressure-proof, the second chamber is not required to satisfy any requirements with respect to resistance to pressure. In connection with high operating temperatures, a particularly long housing of the probe is often required, which functions as a cooling path, so that the required low temperature is available where the electrical feed lines are connected, or for the arrangement of electrical circuits. The first chamber may be very short in this connection, whereas the required structural length of the housing is realized with the formation of a second chamber, which is dimensioned with the required length. The material expenditure for the housing of the probe can be kept particularly low in this way.

According to another embodiment, provision is made for a closing part in the first chamber, which, according to a further embodiment, is preferably arranged on the sensor electrode or on its electrical conductor. In the normal case, the closing part leaves the passage opening open. Small amounts of medium getting into the insulating cover, for example due to diffusion or minor leakage, can then escape without problems from the first chamber into the second chamber. In the presence of a noticeable inflow of medium into the first chamber, the closing part would move in the axial direction toward the separating wall due to the forces of flow or pressure rise acting on it, until it comes to rest on this wall, closing the passage opening.

Another embodiment permits the separation wall and the closing part to act as a switch. In the normal case, when the separation wall and the closing part are not in contact, the switch formed by this wall and part is open. However, the switch closes in the presence of leakage, and in this way can be used for triggering an electric alarm signal.

A reliable insulation of the sensor electrode or its conductor against the separation wall is accomplished through a further embodiment. The clear cross-section in the passage opening is reduced at the same time, and in the presence of a noticeable inflow of medium into the first chamber, a notable amount of medium is prevented in this way from flowing into the second chamber before the closing part closes.

Due to the spring means, for which provision is made according to a further embodiment, the closing part is always in the open position, thus, for example, also with a sensor electrode arranged horizontally, when the probe is intact. This is particularly advantageous also if the closing part and the separation wall form a switch. The spring means are designed in such a way that the closing part closes in the event of any noticeable penetration of medium from the container.

The first chamber is permanently closed in another embodiment. Movably arranged components are not required for this structure.

A further embodiment has an electrical insulation between the sensor electrode and the housing of the probe within the end zone of the first chamber on the container side. An error signal of the probe is avoided in this way if the amount of medium is only small. The medium may penetrate from the container, or form through condensation due to a change in temperature.

Another embodiment permits small amounts of medium received in the second chamber to escape outwardly. This is advantageous for the safe functioning of the probe. Furthermore, a small amount of medium in the second chamber will not lead to a pressure increase. This represents an important advantage for a second chamber which may not be designed pressure-proof. Reaching through into the second chamber from the outside, which could cause functional interferences, as well as the penetration of splash water is prevented.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views:

FIG. 3 shows a capacitive probe with a permanently closed chamber; and

FIG. 4 shows an enlarged view for the closing element of the probe according to FIG. 3.

DETAILED DESCRIPTION OF PREFERRED EMBODIMENTS

Figure 1:
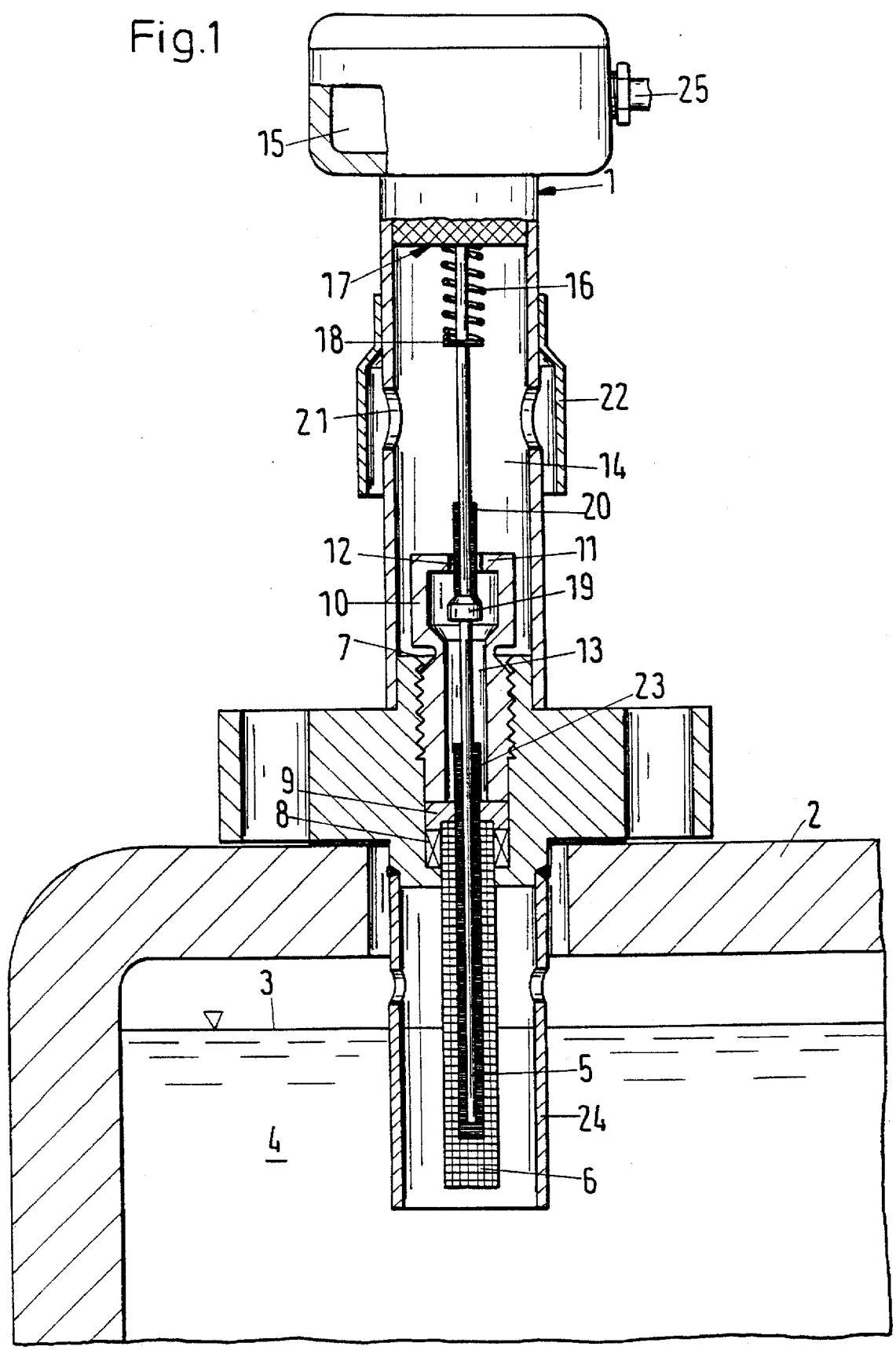
FIG. 1 shows a capacitive probe with a chamber closed only in the presence of leakage.

Turning now in detail to the drawings, FIG. 1 shows the capacitive probe having a probe housing 1, which is mounted on container 2, for example a high-pressure steam boiler (mounting means are not shown). In the container 2, the level 3 of a liquid 4, for example water, is to be monitored with a sensor electrode 5 projecting from the probe housing 1 into the container 2. An insulation sleeve 6, which is designed as a ceramic sleeve that is closed at its end remote from the housing, surrounds the sensor electrode 5 in the container 2 completely and with a spacing. The other, open end of the insulation sleeve 6 projects into a passage bore 7 of the probe housing 1 and is supported there rigidly and sealed by a sealing packing 8, a support disk 9, and a pressure bushing 10, with the bushing being axially adjustably arranged in the passage bore 7.

On the face side at its end remote from the container, the pressure bushing 10 has a separation wall 11 with a passage opening 12, whereby the interior space of the pressure bushing 10 forms a first chamber 13 of the probe housing 1. The pressure bushing 10 including the separation wall 11 is designed to be pressure-proof, for a load on the first chamber 13 by the pressure prevailing in the container 2. The sensor electrode 5 is formed by a metal rod which, functioning as an electrical conductor, extends from the insulation sleeve 6 through the first chamber 13, the latter being close to the container, and the passage opening 12 and into a second chamber 14 of the probe housing 1, the latter chamber being remote from the container, and from there into a connection chamber 15. A pressure spring 16 is present in the second chamber 14, the end of this spring remote from the container being supported on an electrically insulated abutment 17 of the probe housing 1, whereas the other end of the spring, the end facing the container, acts in the longitudinal direction of the electrode on a driver 18 of the sensor electrode 5. A closing part 19 is arranged in the first chamber 13 on the sensor electrode 5, whereas within the zone of the passage opening 12, the sensor electrode 5 is surrounded by a ceramic insulation tube 20. This tube is axially fixed on the sensor electrode 5 and insulates the latter electrically against the separation wall 11. At the same time, it highly constricts the clearance of the cross section of the passage opening 12.

As opposed to the part of the probe housing 1 that is connected with the container 2 and supports the pressure bushing 10, the part of the probe housing 1 surrounding the second chamber 14 is not designed to be pressure-proof. It has the pressure relief openings 21, which connect the second chamber 14 with the environment surrounding the housing. In this regard, a screen wall 22 is arranged on the outside of the probe housing 1 upstream of the pressure relief openings 21 in such a way that a pressure relief is possible between the second chamber 14 and the environment of the housing. However, any reaching through the pressure relief openings 21 as well as any penetration of splash water into the second chamber 14 is prevented.

In the clearance space between the sensor electrode 5 and the insulation cover 6, the sensor electrode 5 is enclosed by an insulator 23, which is designed in the form of a ceramic sleeve as well. This insulator projects through the support disk 9 into the first chamber 13 and in this way insulates there the sensor electrode 5, which it encloses, against the support disk 9 as well as against the pressure bushing 10, and thus against the probe housing 1, which forms the electric mass.

The liquid 4, for example water, and the gaseous medium, for example water vapor present in the container 2 above the liquid level 3, have different dielectric constants. Another electric capacity consequently develops between the sensor electrode 5 and a counter electrode 24, the latter being electrically connected to ground. The changes in capacity lead to a change in the level signal of the probe which, for monitoring the level 3 of the liquid 4, is supplied via a signal line 25 to a suitable monitoring, controlling or evaluating unit (not shown).

If untightness of the outer insulation cover 6 occurs, medium leaks from the container 2 into the first chamber 13. If such leakage is only minor, the closing part 19 remains in the open position, which is its normal position. In this way, the penetrated medium escapes through the cross sectional clearance of the passageway opening 12 into the second chamber 14 and from there through the pressure relief openings 21 into the outside. The insulator 23 and the insulation tube 20 prevent in this regard the development of an electrically conductive connection between the sensor electrode 5 and the pressure bushing 10 electrically connected to mass, which connection would interfere with the function. The pressure spring 16 assures the open position of the closing part 19 in any position at which the probe is installed, for example also if the sensor electrode 5 is installed horizontally.

Any major leakage, for example a fracture of the insulation cover 6, would result in a distinct pressure rise in the chamber 13. Such rise in pressure, and the flow occurring in the chamber 13 in connection with such a rise, would overcome the opening force of the pressure spring 16. This would move the sensor electrode 5, which is arranged axially movable in the probe housing 1, and with it the closing part 19 in the direction toward the second chamber 14 until the closing part 19 comes to rest against the separation wall 11, sealing the separation wall and the first chamber 13 against the second chamber 14. Since the closing part 19 and the separation wall 11 are both designed electrically conductive, they act like a switch, which is closed, whereas it is open in the normal case. Due to this switch function, an alarm signal can be triggered when untightness has occurred. Since the cross-section clearance of the passage opening 12 is highly constricted by the sensor electrode 5 and the insulation tube 20 when the closing part 19 is open, no notable amount of medium can flow from the first chamber 13 into the second chamber 14 before the closing part 19 closes.

Furthermore, any medium that has penetrated into this chamber 14 escapes to the outside through the pressure compensation openings 21, so that no noticeable pressure increase takes place in the second chamber 14. Therefore, medium under pressure can neither flow from the container 2 into the second chamber 14 nor to the outside. This is very important according to the concept of safety technology when the probe is used under very high pressures and temperatures. Furthermore, the wall of the probe housing 1 can be designed relatively thin within the range of the second chamber 14. This offers not only cost benefits but also leads to good cooling of the probe housing 1, so that a low temperature is assured in the connection chamber 15.

Figure 2:
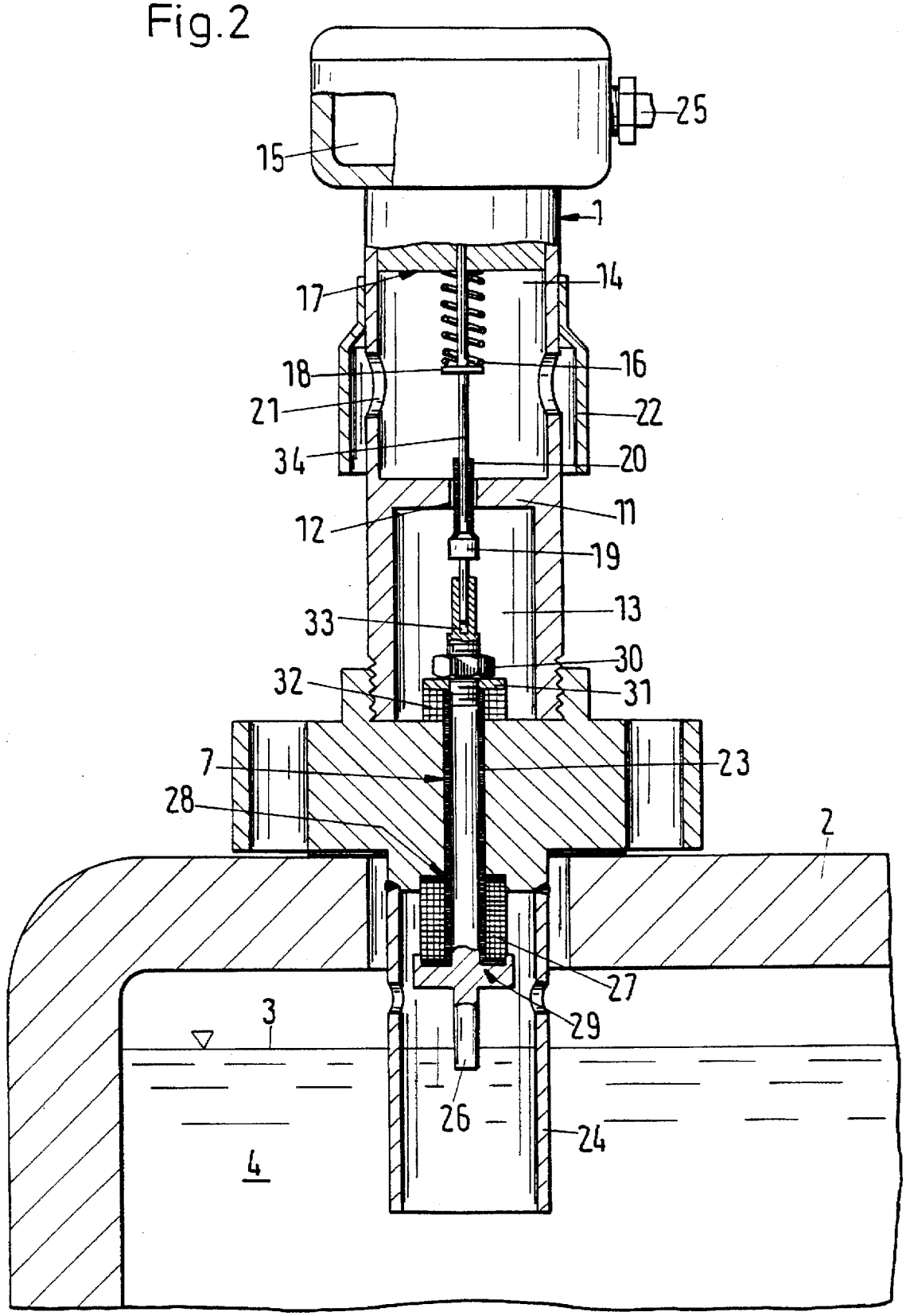
FIG. 2 shows a conductive probe with a chamber closed only in the presence of leakage.

A difference between the capacitive probe according to FIG. 1, and the conductive probe according to FIG. 2, is that the sensor electrode 26 of FIG. 2 in the container 2 is not enclosed by an insulation cover 27 over the entire length, but only across a longitudinal segment adjoining the probe housing 1. This cover 27 is designed as a ceramic sleeve, which is axially clamped on the sensor electrode 26 between a support surface 28 on the probe housing 1, and a support shoulder 29 on the sensor electrode 26, in a sealed manner. The required sealing force is generated by a nut 30, which is screwed to the sensor electrode 26 in the chamber 13. This nut supports itself for this purpose on the probe housing 1 via a support disk 31 and a ceramic insulation sleeve 32. The tubular insulator 23 surrounding the sensor electrode 26 effects in the passage bore 7 and in the adjoining part of the chamber 13 an insulation of the sensor electrode 26 against the probe housing 1.

At its end that is present in the chamber 13, the sensor electrode 26 has a contact bore 33 in the longitudinal direction. This bore 33 is engaged by the end of a rod-like electrical conductor 34. An electrically conductive and axially movable connection exists between the conductor 34 and the sensor electrode 26. The conductor 34 extends through the passage opening 12 and the chamber 14 up into the connection chamber 15. In the chamber 13, it supports the closing part 19, whereas within the zone of the passage opening 12, this conductor 34 is surrounded by the insulation tube 20, and in the chamber 14, it has the driver 18 for the action of the pressure spring 16.

The part of the probe housing 1 connected with the container 2 and surrounding the first chamber 13, including the separation wall 11, is designed to be pressure-proof according to the pressure in the container 2. The part of the sensor housing 1 receiving the second chamber 14 is not designed to be pressure-proof. It has the pressure compensation openings 21 and the screen wall 22. Wall 22 is a protective means that prevents a person or object in the environment from reaching through the pressure compensation opening 21.

In the container 2 equipped with the conductive probe, the liquid 4, for example water, and the gaseous medium present above the surface 3, for example water vapor, have different electrical conductivities. Another electrical resistance consequently develops between the sensor electrode 26 and the counter-electrode 24, the latter being connected to ground, depending on the medium present. The changes in resistance lead to a change of the level signal of the probe.

If medium is received from the container 2 into the first chamber 13 of the conductive probe according to FIG. 2 due to untightness or leakage of the insulation cover 27, the operating procedure that has been described above for the capacitive probe according to FIG. 1 similarly applies to FIG. 2.

Instead of a closing part that is movable by stroke, the capacitive probe according to FIG. 3 has a stationary closing element 35, which permanently closes the passage opening 12 of the separation wall 11. The closing element 35 (see FIG. 4) is designed in the form of a ceramic sleeve, through which an electrical conductor 36 extends, whereby the ceramic sleeve and the conductor 36 are rigidly joined and tightly connected with each other by soldering. At its one end, the conductor 36 is electrically conductively connected with the sensor electrode 5 via a contact bushing 37, whereas with its other end, it extends through the second chamber 14 and into the connection chamber 15.

In a further embodiment, it is possible also to extend the sensor electrode 5 in one piece from the insulation cover 6 up into the connection chamber 15, and to combine the closing element 35 directly with the sensor electrode 5 by soldering. In another embodiment, for example, it would be possible to have a three part construction, in which a short conductor is used for the closing element 35, and the sensor electrode 5 is connected to this short conductor, on the one hand, and a third conductor extending into the connection chamber 15 is electrically connected to this short conductor, on the other hand.

If, due to an untightness or leakage of the insulation cover 6, medium penetrates from the container 2 into the first chamber 13, the closing element 35 of FIG. 3 prevents such medium from escaping from the pressure-proof first chamber 13 into the second chamber 14, which is not pressure-proof. If a significant amount of moisture collects in the first chamber 13, this leads either to an electrically conductive connection between the sensor electrode 5 and the pressure bushing 10, or to a change in the electrical capacity between the two, depending on the electrical properties of such moisture, which may trigger an alarm signal. Therefore, a defect is detected early, and an early repair is possible, so that it is possible to use a closing element 35 that may not permanently withstand the chemical corrosivity and reactiveness, if any, of the medium in the container 1, but only for a limited period of time.

Although the probes shown in the drawing each have an electrical conductor extending through the chambers, the invention is suitable also for probes with a plurality of conductors. All conductors either can be provided with a movable closing part or all conductors can be fitted with a stationary closing element. Also a combination could be possible, i.e., one or a few conductors are fitted with a movable closing part, and the one or several other conductors receive a stationary closing element.

While several embodiments of the present invention have been shown and described, it is to be understood that many changes and modifications may be made thereunto without departing from the spirit and scope of the invention as defined in the appended claims.

What is claimed is:

1. Probe for monitoring liquid in a container, comprising
a probe housing to be mounted on the container, and said probe housing having an interior space;
the interior space of the probe housing having a first chamber close to the container and a second chamber remote from the container, a separation wall present between said first chamber and said second chamber, and said separation wall being provided with a passage opening;
a sensor electrode extending into the container and extending from the first chamber through the passage opening and into the second chamber;
an insulation cover surrounding the sensor electrode in the container and supported sealingly on the probe housing;
the wall of the first chamber close to the container, including the separation wall, being pressure-proof; and
a closing part for the passage opening being arranged in the first chamber, said closing part being axially movable against the separation wall and, with the probe intact, assuming a position remote from the passage opening, whereas, under the influence of the inflow of medium from the container, it closes the passage opening pressure-tight.

2. Probe according to claim 1,
wherein the sensor electrode is arranged axially movable against the separation wall and supports the closing part.

3. Probe according to claim 1,
wherein the closing part and the opposite part of the separation wall are electrically conductive.

4. Probe according to claim 1,
wherein the sensor electrode is surrounded in the passage opening by an electrical insulation.

5. Probe according to claim 1, further comprising
spring means for generating an opening force acting on the closing part.

6. Probe according to claim 1, wherein the sensor electrode is surrounded in the end zone of the first chamber on the container side by an electrical insulator.

7. Probe according to claim 1,
wherein the probe housing has at least one pressure relief opening connecting the second chamber with an environment surrounding the housing; and
protective means on the probe housing preventing a person or object in the environment from reaching through the pressure relief opening.

8. Probe for monitoring liquid in a container, comprising
a probe housing to be mounted on the container, and said probe housing having an interior space;
the interior space of the probe housing having a first chamber close to the container and a second chamber remote from the container, a separation wall present between said first chamber and said second chamber, and said separation wall being provided with a passage opening;
a sensor electrode extending into the container, and an electrical conductor connected to said sensor electrode and extending from the first chamber through the passage opening and into the second chamber;
an insulation cover surrounding the sensor electrode in the container and supported sealingly on the probe housing;
the wall of the first chamber close to the container, including the separation wall, being pressure-proof; and
a closing part for the passage opening being arranged in the first chamber, said closing part being axially movable against the separation wall and, with the probe intact, assuming a position remote from the passage opening, whereas, under the influence of the inflow of medium from the container, it closes the passage opening pressure-tight.

9. Probe according to claim 8,
wherein the sensor electrode or the conductor is arranged axially movable against the separation wall and supports the closing part.

10. Probe according to claim 8,
wherein the closing part and the opposite part of the separation wall are electrically conductive.

11. Probe according to claim 8,
wherein the sensor electrode or the conductor is surrounded in the passage opening by an electrical insulation.

12. Probe according to claim 8, further comprising
spring means for generating an opening force acting on the closing part.

13. Probe according to claim 8, wherein the sensor electrode is surrounded in the end zone of the first chamber on the container side by an electrical insulator.

14. Probe according to claim 8,
wherein the probe housing has at least one pressure relief opening connecting the second chamber with an environment surrounding the housing; and
protective means on the probe housing preventing a person or object in the environment from reaching through the pressure relief opening.

15. Probe for monitoring liquid in a container, comprising
a probe housing to be mounted on the container, and said probe housing having an interior space;
the interior space of the probe housing having a first chamber close to the container and a second chamber remote from the container, a separation wall present between said first chamber and said second chamber, and said separation wall being provided with a passage opening;
a sensor electrode extending into the container and extending from the first chamber through the passage opening and into the second chamber;
an insulation cover surrounding the sensor electrode in the container and supported sealingly on the probe housing;
the wall of the first chamber close to the container, including the separation wall, being pressure-proof;
a closing element made of insulation material and closing the passage opening pressure tight is mounted on the separation wall; and
the closing element comprises a ceramic sleeve.

16. Probe for monitoring liquid in a container, comprising
a probe housing to be mounted on the container, and said probe housing having an interior space;
the interior space of the probe housing having a first chamber close to the container and a second chamber remote from the container, a separation wall present between said first chamber and said second chamber, and said separation wall being provided with a passage opening;
a sensor electrode extending into the container, and an electrical conductor connected to said sensor electrode and extending from the first chamber through the passage opening and into the second chamber;
an insulation cover surrounding the sensor electrode in the container and supported sealingly on the probe housing;
the wall of the first chamber close to the container, including the separation wall, being pressure-proof;
a closing element made of insulation material and closing the passage opening pressure tight is mounted on the separation wall, said closing element being penetrated by the electrical conductor extending between the two chambers; and
the closing element comprises a ceramic sleeve.

17. Probe according to claim 16, wherein the conductor is joined with said sleeve by soldering.

* * * * *